UNITED STATES PATENT OFFICE.

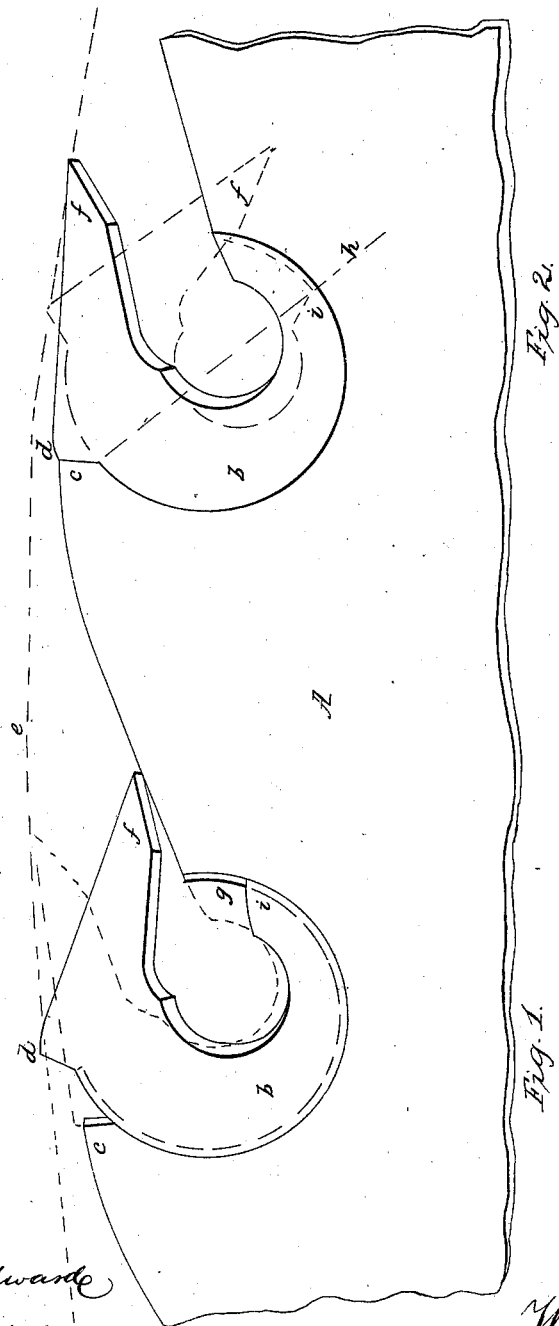

WARREN P. MILLER, OF NEW YORK, N. Y.

Letters Patent No. 81,811, dated September 1, 1868.

---

IMPROVEMENT IN SAWS.

---

The Schedule referred to in these Letters Patent and making part of the same.

---

Be it known that I, WARREN P. MILLER, of the city, county, and State of New York, have invented a new and useful Improvement on my Mode of Attaching Teeth to Saws, the same as that for which Letters Patent were granted me, the undersigned, on the ninth day of October, in the year one thousand eight hundred and sixty-six, and are numbered 58,664; and I do hereby declare that the following is a full, clear, and exact description of the construction and operation of the same, reference being had to the annexed drawings, making part of this specification, in which—

Letter A represents a section of a saw-plate with two teeth inserted.
Figure No. 1 shows a tooth with the point turned down.
Figure No. 2 represents a tooth in the proper position for work.
Like letters refer to like parts in the drawing.
Letter A, section of a saw-plate.
Letters $b\ b$ are teeth.
Letters $c\ c$, square ends of the plate or shoulder-rests.
Letters $d\ d$, shoulder of the teeth.
Letters $d\ e$, line of the teeth when in position.
Letters $f\ f$, points of the teeth.
Letters $f$ G show the V-edge of the socket.
Letters $i\ i$, heel of the teeth.

The object of my invention is to provide a ready means of adjusting insertible saw-teeth to a true circle or cutting-line in relation to the centre of the axis of the saw, and it consists in forming a plane-faced shoulder upon the tooth which abuts against a terminal rest upon the saw-plate above the recess that receives the shank of the tooth.

The plane shoulder on the tooth can be filed, to elevate the tooth truly to the cutting-line, and, in case one or more teeth have by any cause been reduced so that the cutting-point is below or within the cutting-line, they can be adjusted to their original position at the cutting-line by simply filing the shoulder on the tooth, as above stated, thus avoiding the necessity of filing off the points of the perfect teeth to correspond with those that may have been reduced in their projection.

To enable others skilled in the art to make and use my invention, I will proceed to describe its construction and operation.

I construct a saw-tooth in the form as shown in the drawing, the shank of which is round, and comprises more than a half of a circle. A V-groove is cut all around in the periphery of the shank, and terminates at the shoulder $d$. Said shoulder and the end of the plate or rest $c$ form a butt-joint.

The socket in the plate is formed to fit said tooth, with a V-edge, as shown at G.

The tooth is inserted into the socket in the manner as shown by the dotted lines on fig. No. 2. The point of the tooth $f$ lies on the side of the plate; the heel $i$ is placed within half the circle as represented from $c$ to $h$; the top of the tooth is then struck a light blow or two with a hammer, which will cause the tooth to settle down into the socket; a lever is next applied to the straight part of the tooth, and by which means it is turned into the socket, and the projection $d$ is brought in contact with the end of the plate or rest at $c$.

The manner of adjusting the teeth is as follows:

Whenever a tooth is rendered too short, from any cause, turn the point $f$ down, as shown at fig. 1, so as to expose the shoulder $d$, file away a portion of it, then turn the tooth back into position, and the point will be projected to the cutting-line.

I am aware that shoulders on insertible saw-teeth have been made in circular form, and having either a V-shaped groove therein, or a V-shaped tongue that fits in a corresponding groove or tongue in the saw-plate. Such construction I do not claim as my invention, for in practice it is found that, in swaging the point of a tooth, that part having the groove in it will split, and destroy the tooth or damage the saw-plate. Nor will such construction admit of the filing away of the parts, to adjust the point of the tooth to the cutting-line, as can be done by my construction.

The advantages that the square shoulder has over those formed on circular lines are—

First, it forms a more substantial backing to support the tooth, while, being upset with the swage at the point, the shoulder does not split and give way, as is the case when the shoulder is grooved.

Second, the shoulder being square, admits of being filed so as to adjust the teeth in the manner described.

What I claim as new, and desire to secure by Letters Patent, is—

1. The shoulder $d$, on tooth $b$, and rest $c$, on saw-plate A, when constructed and arranged to operate in the manner and for the purpose substantially as described.

2. A detachable saw-tooth, in which is combined a circular shank adapted to a circular recess in the saw-plate, and having shoulder $d$, adapted to abut against rest $c$, on the saw-plate, as described.

WARREN P. MILLER.

Witnesses:
   JNO. S. WOODWARD.
   DAVID M. EDSALL.